United States Patent [19]

Kitahara et al.

[11] Patent Number: 4,600,071
[45] Date of Patent: Jul. 15, 1986

[54] FLOW CONTROL APPARATUS FOR POWER STEERING

[75] Inventors: Hisashi Kitahara; Noboru Hattori, both of Yokosuka; Yoshiaki Kato, Fujisawa; Nobuteru Hitomi, Yokohama, all of Japan

[73] Assignee: Nissan Motor Co., Ltd., Yokohama, Japan

[21] Appl. No.: 660,099

[22] Filed: Oct. 12, 1984

[30] Foreign Application Priority Data

Oct. 14, 1983 [JP] Japan .................. 58-190973

[51] Int. Cl.$^4$ ............................................. B60K 25/00
[52] U.S. Cl. ................................... 180/53.8; 60/459; 74/856; 180/132
[58] Field of Search .............. 180/53.1, 53.4, 53.8, 180/132; 74/336 R, 856, 857, 859; 60/459, 385, 386; 417/2

[56] References Cited

U.S. PATENT DOCUMENTS

| | | | |
|---|---|---|---|
| 2,911,962 | 11/1959 | McRae | 123/41.11 |
| 2,916,024 | 12/1959 | Dodge | 180/53.8 X |
| 4,381,684 | 5/1983 | Himmelstein | 74/857 X |
| 4,460,056 | 7/1984 | Jaccod | 180/53.7 |
| 4,495,962 | 1/1985 | Hattori et al. | 137/117 |

FOREIGN PATENT DOCUMENTS

| | | | |
|---|---|---|---|
| 2509820 | 1/1983 | France | 180/53.1 |
| 2069595 | 8/1981 | United Kingdom . | |

Primary Examiner—John J. Love
Assistant Examiner—Charles R. Watts
Attorney, Agent, or Firm—Schwartz, Jeffery, Schwaab, Mack, Blumenthal & Evans

[57] ABSTRACT

In order to prevent sudden fluctuations in the supply of hydraulic fluid fed to a power steering or like servo mechanism and to enable the downshifting of a transmission used to drive the pump and an ancillary device such as an alternator, at speeds suited to the specifications of the alternator, a "flow-down" valve induces first and second flow reductions which are separated by an engine speed range which enables the higher downshift speed to be selected at an engine speed suited to the specifications of the alternator. The first flow reduction or flow-down occurs within a relatively narrow engine speed range. This facilitates the above mentioned selection and additionally enables a change from a high power steering assist at low speed to an intermediate one. The second "flow-down" enables a more gradual change from the intermediate assist to a low level one suitable for high speed driving. In the embodiment of the invention, the engine speeds at which the transmission is downshifted are selected to correspond to the pump speed just before and just after the first flow reduction occurs in the upshift and downshift conditions of the transmission, respectively. Shifting of the transmission due to sharp changes in load is inhibited when the engine is operating between the first and second speeds.

6 Claims, 13 Drawing Figures

FLOW CONTROL APPARATUS FOR POWER STEERING

BACKGROUND OF THE INVENTION

1. Field of the Invention

The present invention relates generally to an automotive vehicle and more specifically to a flow control arrangement via which the degree power steering assist is reduced with an increase of vehicle speed and which obviates sudden changes in assist due to changes in load applied to ancillary equipment such as an alternator or the like.

2. Description of the Prior Art

Figure 1:
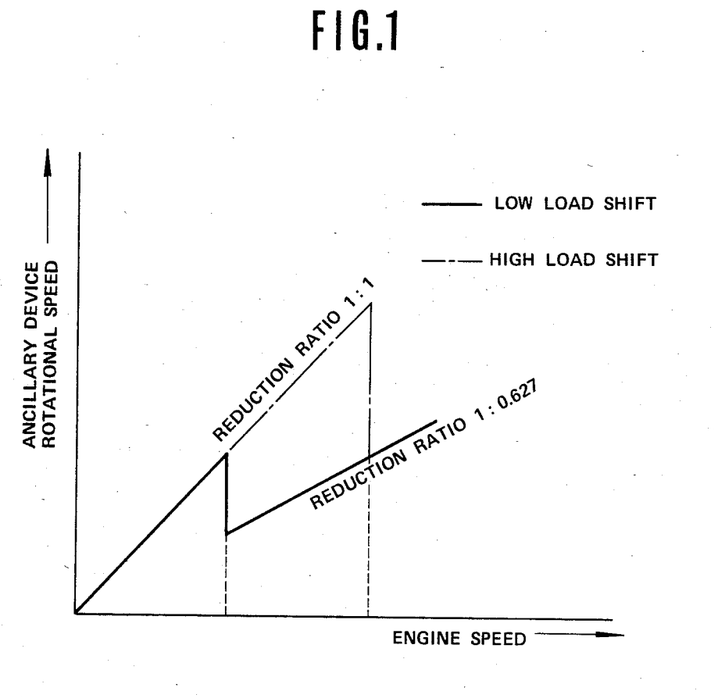

In order to simplify engine arrangements it is a common practice to drive ancillary or auxiliary apparatus such as a power steering pump and alternator using the same belt and pulley arrangement. Further, in order to both protect the alternator from being rotated at excessively high rotational speeds and to improve engine fuel economy, a step down transmission is often disposed between the engine and drive pulley via which the pump and alternator are driven. With this type of transmission if, as shown in FIG. 1, the load on the alternator is light, then the transmission is arranged to downshift at an engine speed of 1,200 RPM, for example, while if the load on the alternator is high, due to the operation of an air conditioner unit or the like, then the downshift is made at a higher engine speed (for example, 2,150 RPM) so as to ensure that the output of the alternator is adequate to meet the demand. An example of the above mentioned transmission may be found in Japanese Utility model application first publication 57-67148.

It is also a current practice to vary the output of the power steering pump in a manner to provide a high degree of power steering assist at low engine speeds when the steering is heavy and to reduce the assist as the vehicle speed increases in order to give the steering a solid or stable "feel" and prevent dangerous steering phenomenon due to accidental steering wheel movement at high vehicle speeds.

Figure 2:
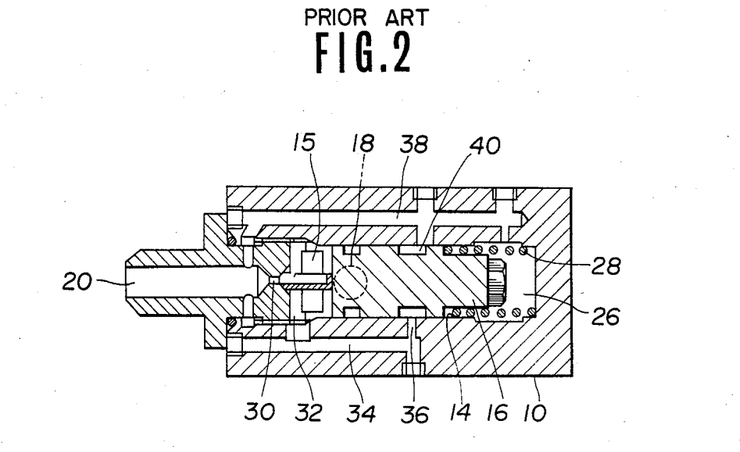
FIG. 2 is a sectional view showing in detail the prior art "flow-down" valve discussed in the opening paragraphs of the instant disclosure.
Figure 3:
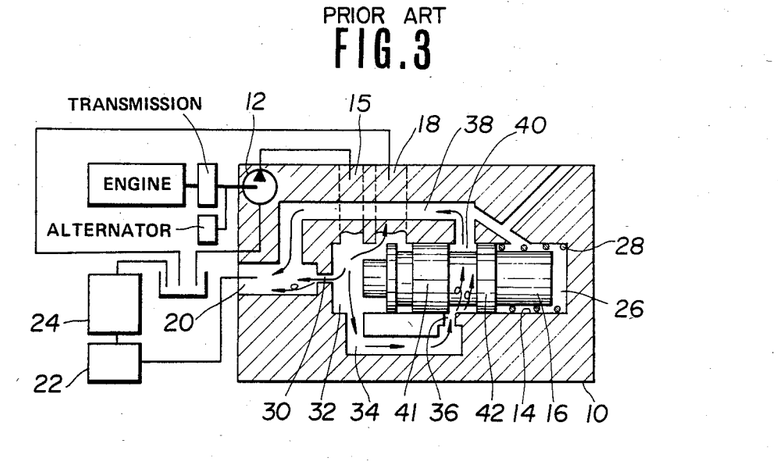
FIG. 3 is a schematic view of the arrangement shown in FIG. 2, which illustrates the various flows which occur within the valve and its connections with the other elements of the system of which it forms a part.

A valve which provides such a reduction in power steering assist is shown in FIGS. 2 and 3 of the drawings. This valve takes the form of a so called "flow-down" valve which, due to its construction, induces a reduction in output to the power steering control valve and servo, upon the displacement of the pump per se, reaching a given level.

Figure 4:
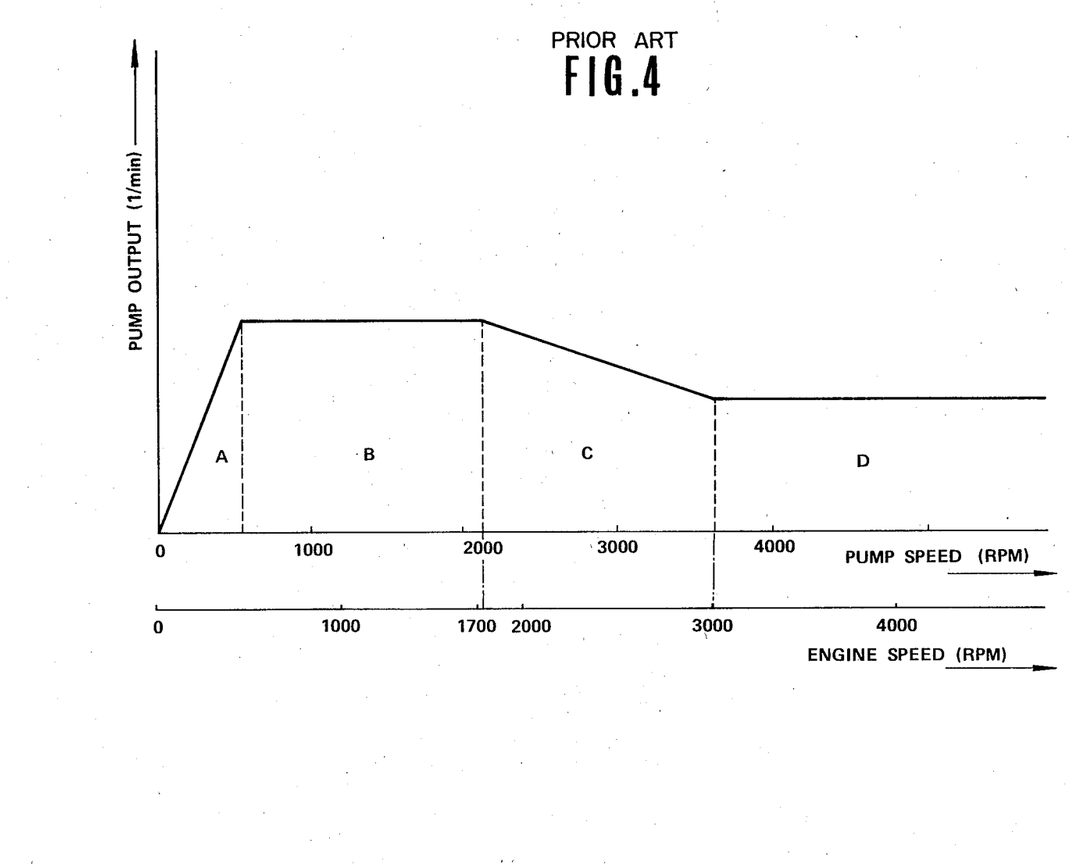
FIG. 4 is a graph showing, in terms of pump output and engine speed (and pump speed), the output characteristics obtained with the valve arrangement shown in FIG. 1 when the pump speed varies continuously with engine speed.

FIG. 4 shows, in graphical form, the performance characteristics provided by the above mentioned "flow-down" valve. As shown, upon the pump speed reaching 2,125 RPM the flow-down valve induces a gradual reduction in output. This reduction terminates upon the pump speed reaching a value of approximately 3700 RPM, whereafter the output becomes essentially constant. Accordingly, the power assist at engine speeds up to 1,700 RPM is high (see section B) enabling easy vehicle maneuvering during parking etc., and then gradually decreases (see section C) to a level (D) suitable for medium-high speed cruising.

In more detail, this flow-down valve includes a body 10 which, in this case, is integral with the body of the pump 12 and therefore essentially part of the pump. The body 10 is formed with bore 14 in which a spool 16 is reciprocally disposed. The body further includes a port 15 via which the discharge from the pump 12 is directly introduced, a drain port 18 and a discharge port 20 which fluidly communicates with a control valve 22 and a power steering servo 24. The spool 16 is received in the bore so as to define a feed back chamber 26. A spring 28 is disposed in this chamber 26 and arranged to urge the spool 16 in a direction which tends to close the drain port 18 and to close an orifice 30 which provides fluid communication between a pressure chamber 32 and the discharge port 20. As shown, the port 15 opens into the pressure chamber 32. A first by-pass passage 34 leads from the pressure chamber 32 to an orifice 36. A second by-pass passage 38 leads from a chamber 40 defined between lands 41, 42 of the spool 16 and the feedback chamber 26 to the discharge port 20. The orifice 36 also communicates with this chamber.

With this arrangement, upon the pressure in the pressure chamber 32 increasing, the spool 16 is forced back against the force of the spring 28 and the decreasing pressure in the feedback chamber 26 in a manner to increase the communication between the pressure chamber 32 and the drain port 18 while simultaneously modifying the communication between the by-pass passage 34 and the chamber 40 via the partial or total closure of the orifice 36 by land 41.

Figure 5:
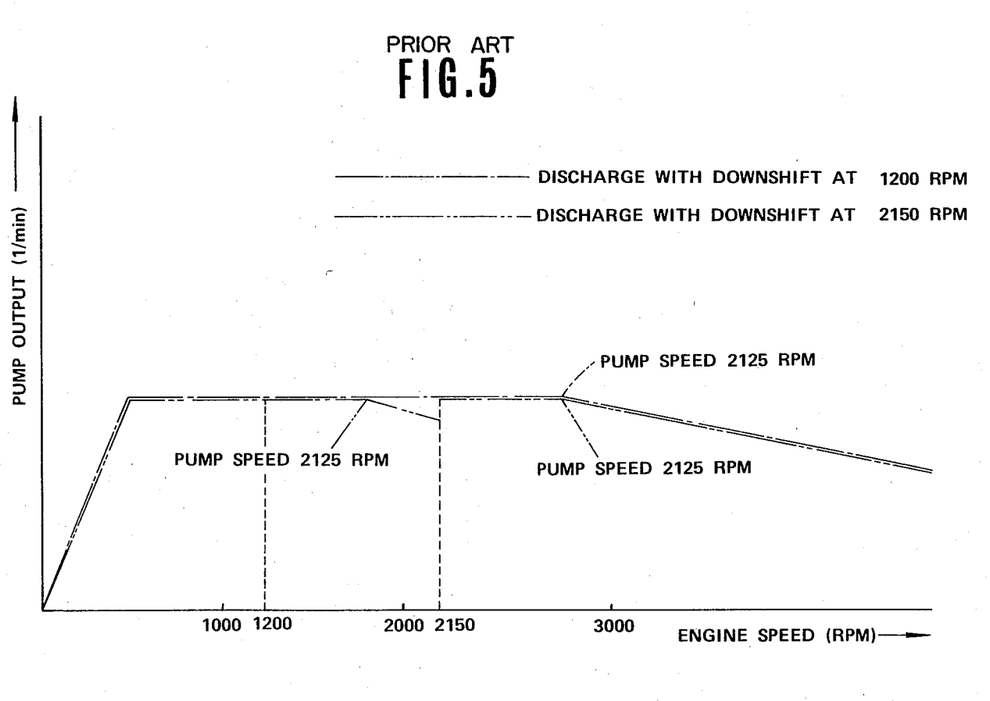
FIG. 5 is a graph similar to that shown in FIG. 4, illustating the sudden change in pump output which tends to occur with the prior art flow-down valve when used in combination with a step down transmission which exhibits shift characteristics such as depicted in FIG. 1.

However, this type of valve, when used in combination with the previously mentioned transmission arrangement encounters the drawback that, as shown in FIG. 5, should the transmission effect a downshift while the valve is effecting a flow reduction or flow-down, then as the rotational speed of the pump 12 drops due to the downshift, the pressure in the pressure chamber 32 drops and the spool 16 moves to the left as shown in the drawings. This tends to close off the drain port 18 and cause a sudden sharp increase in the amount of fluid fed to the power steering control valve 22 and servo 24. This of course suddenly increases the power steering assist at a time when a gradual decrease is being effected and thus tends to impart a disconcerting feel to the vehicle steering.

One way of avoiding this problem is to set the higher of the two downshift speeds at either 1,700 or 3,100 RPM. Viz, on either side of the engine speed range in which the flow reduction is produced by the flow-down valve (see section C in FIG. 4). However, while avoiding the variation in steering assist, this induces the problem that if the high speed downshift is made at 1,700 RPM an expensive alternator having a particularly high capacity is required (because of the relatively low rotational speed), while if made at 3,100 RPM, the alternator tends to be rotated at excessive speeds and induces increased engine fuel consumption.

SUMMARY OF THE INVENTION

It is an object of the present invention to provide a flow control arrangement for an automotive power steering wherein the power steering pump thereof is driven by the same two stage transmission used to prevent an alternator or like device from being subject to excessively high rotational speeds and which does not exhibit any sudden changes in pump output as a result of transmission shifting and which enables appropriate alternator speed control.

In brief, the above object is fullfilled by an arrangement wherein, in order to prevent sudden fluctuations in the supply of hydraulic fluid fed to a power steering or like servo mechanism and to enable the downshifting of a transmission used to drive the pump and an ancillary device such as an alternator, at speeds suited to the specifications of the alternator, a "flow-down" valve induces first and second flow reductions which are separated by an engine speed range which enables the higher downshift speed to be selected at an engine speed suited to the specifications of the alternator. The first flow reduction or flow-down occurs within a relatively narrow engine speed range. This facilitates the above mentioned selection and additionally enables a change from a high power steering assist at low speed to an intermediate one. The second "flow-down" enables a more gradual change from the intermediate assist to a low level one suitable for high speed driving. In the embodiment of the invention, the engine speeds at which the transmission is downshifted are selected to correspond to the pump speed just before and just after the first flow reduction occurs in the upshift and downshift conditions of the transmission, respectively. Shifting of the transmission due to sharp changes in load is inhibited when the engine is operating between the first and second downshift speeds.

More specifically, the present invention takes the form of a system which includes: an engine; an ancillary device; a pump for supplying fluid under pressure to a servo mechansim; a transmission which provides a drive connection between the engine, the ancillary device and the pump, the transmission being shiftable between first and second gear ratios to reduce the rate at which the pump and the ancillary device are driven by the engine; a valve interposed between the pump and the servo mechanism for modifying the amount of fluid supplied from the pump to the servo, the valve inducing a first flow reduction between first and second pump speeds and second flow reduction between third and fourth pump speeds, and a transmission shift control arrangement which is responsive to the load on the ancillary device in a manner that when the load is below a predetermined level, the transmission is downshifted from the first gear ratio to the second one at a first engine speed and when the load is above the predetermined level, the transmission is downshifted from the first gear ratio to the second one at a second engine speed which is higher than the first one, the first engine speed being selected to be lower than the engine speed which corresponds to the first pump speed when the transmission is in the first gear ratio and the second engine speed selected to be between the engine speeds which correspond to said second and third pump speeds when said transmission is in the first gear ratio.

BRIEF DESCRIPTION OF THE DRAWINGS

The features and advantages of the arrangement of the present invention will become more clearly appreciated from the following description taken in conjunction with the accompanying drawings wherein like elements are denoted by the same numerals and in which:

FIG. 1 is a graph showing in terms of ancillary device rotational speed and engine speed, the shift characteristics provided by a two stage step-down transmission used to reduce the rotational speed of an ancillary device associated with an internal combustion engine or the like;

DETAILED DESCRIPTION OF THE PREFERRED EMBODIMENTS

Figure 6:
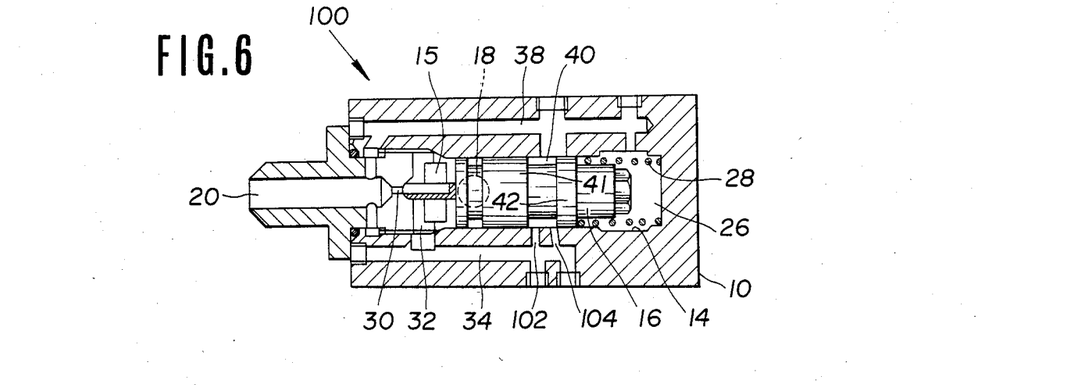
FIG. 6 is a sectional view showing a flow-down valve according to the present invention.
Figure 7:
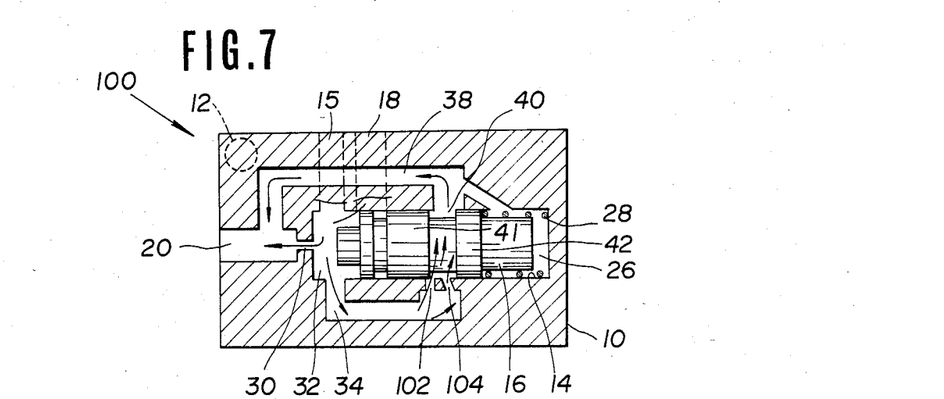
FIGS. 7 to 10 show in schematic form, the flow-down valve according to the present invention in its various modes of operation.
Figure 8:
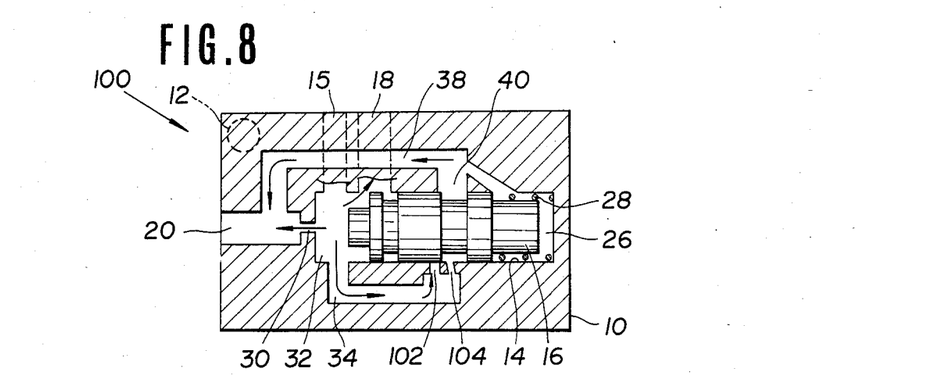
Figure 9:
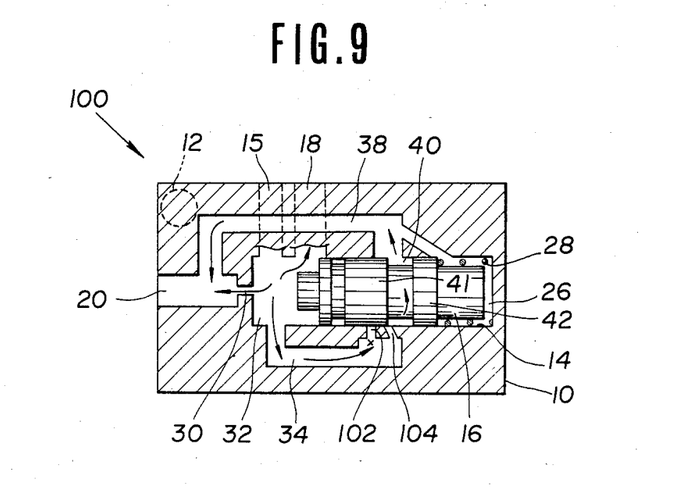
Figure 10:
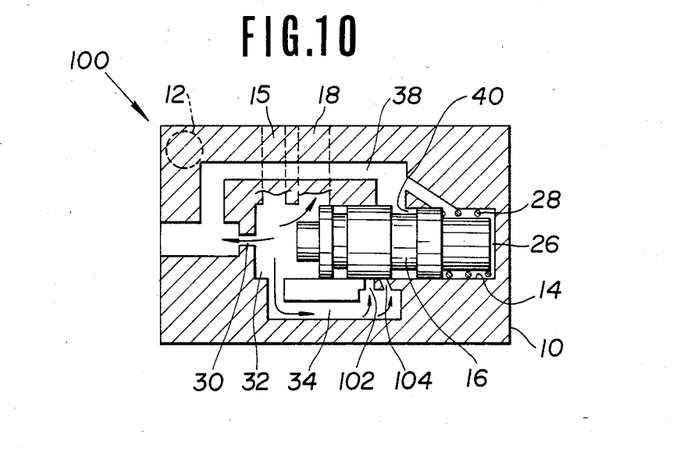

FIG. 6 shows a flow control valve 100 according to the present invention. This valve differs from the prior art arrangement by the provision of two orifices or flow restrictions 102, 104 between the first bypass passage 34 and chamber 40 defined between lands 41 and 42. This valve, like the prior art arrangement is formed integrally with the pump per se and is connected with an engine and transmission, etc., in a manner essentially similar to that shown in FIG. 3.

Figure 12:
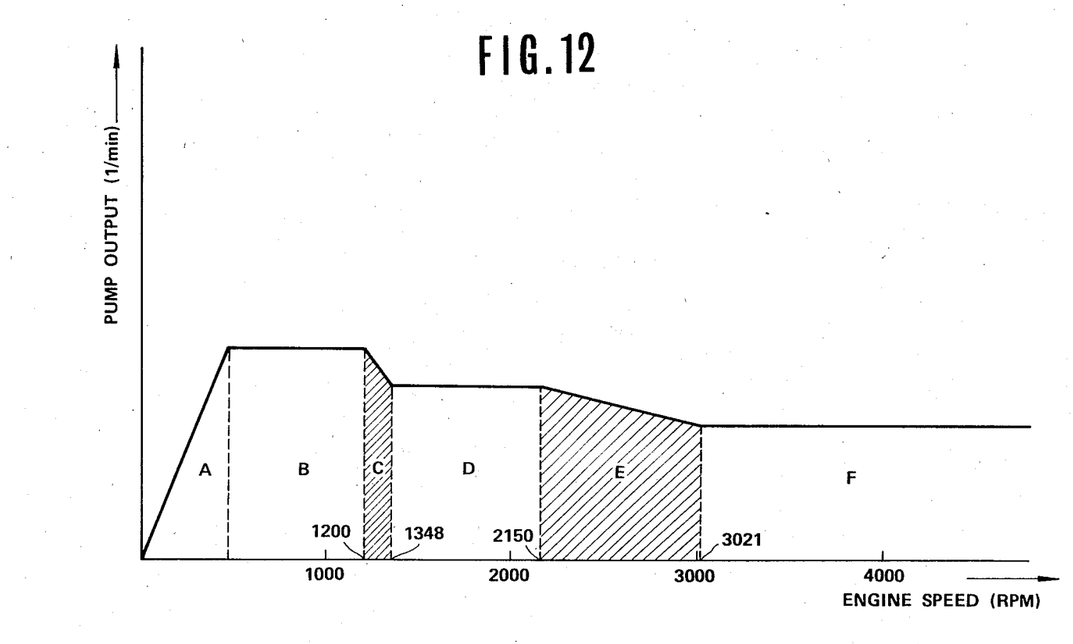
FIG. 12 is a graph showing in terms of pump output and engine speed, the output characteristics provided by the flow-down valve shown in FIG. 6 when the pump speed varies continuously with engine speed.
Figure 13:
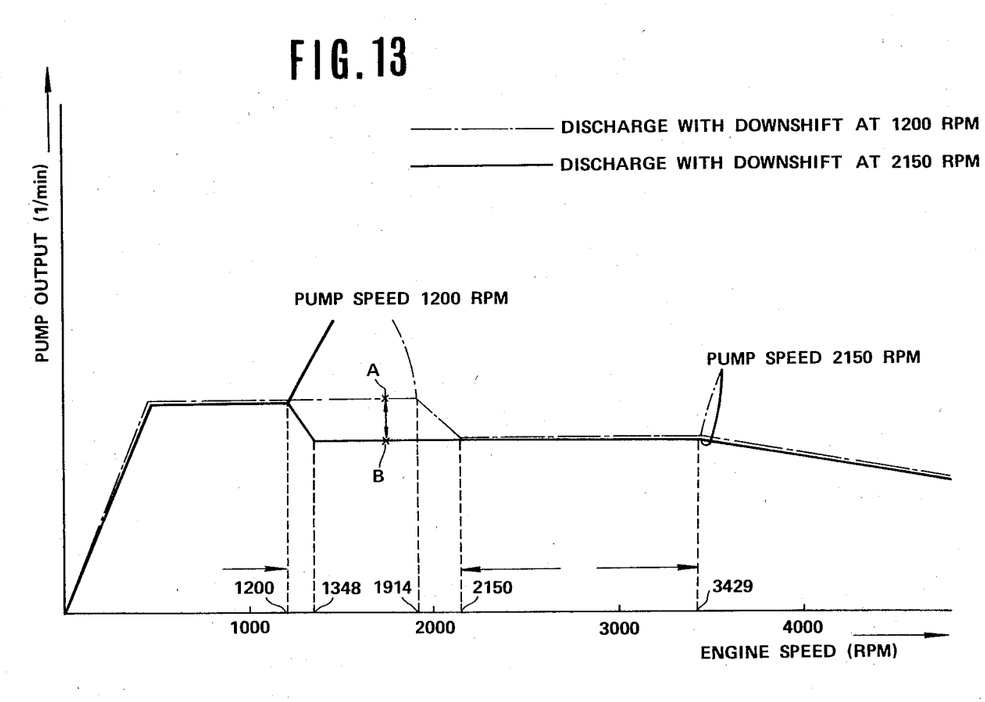
FIG. 13 is a graph showing the output characteristics provided by the valve shown in FIG. 6, when the transmission is downshifted in response to low and high ancillary device loads, respectively.

The provision of the two orifices 102, 104 endows two flow reductions or "flow downs" such as shown by the hatched sections C and E of FIG. 12. As will be appreciated the first of the flow-downs occurs within a relatively narrow engine speed band while the second occurs more gradually over a wider engine speed range. This, apart from providing a two stage reduction in power steering assist, facilitates the appropriate selection of the downshift speeds. Viz., as shown in FIG. 13, if the first downshift speed is selected to be at or lower than 1,200 RPM then there is no possibility that the low speed downshift will occur during a flow-down. Further, by selecting the engine speed at which the high speed downshift occurs between the engine speeds of 2,150 and 3,429 RPM, then there is no possibility that the high speed downshift will occur during a flowdown. It will be appreciated that the selection or variation of the orifices 102 and 104 will enable the tailoring of the down flow characteristics of the valve to meet both power steering as well as ancillary equipment requirements.

Figure 11:
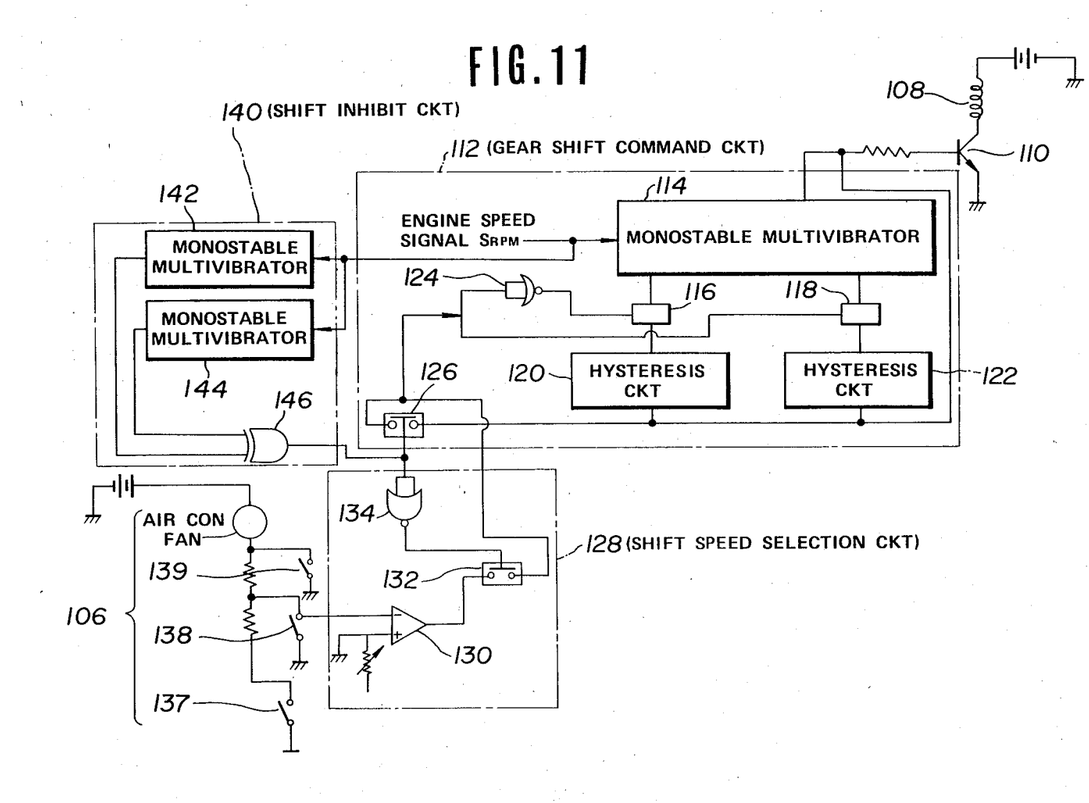
FIG. 11 shows a control circuit which is used to control the shifting of the transmission used in conjunction with the flow-down valve arrangement of the present invention.

FIG. 11 shows a circuit used to control the shifting of the transmission via which the pump 12 is driven by the engine. Merely by way of example, it will be assumed that the major source of alternator (ancillary device) power drain comes in the form of an air conditioning unit 106 having, by way of example, 3 fan stages.

More specifically, the circuit includes a solenoid 108 which is used to control the shifting of the transmission. The transmission is downshifted when the solenoid is de-energized. As shown, this solenoid 108 is circuited with a power transistor 110 the base of which receives an output from a gear shift command circuit 112. This circuit 112 includes a monostable multivibrator 114, first and second switches (e.g. transistors) 116, 118, first and second hysteresis circuits 120, 122, and inverter 124 and a switch 126 which also may take the form of a simple transistor. The monostable multivibrator 114 receives a signal $S_{RPM}$ indicative of engine speed. In this embodiment the signal takes the form of an ignition pulse train. This signal is used to trigger the monostable multivibrator 114 and induce same to output a high level signal until the frequency of the pulse train exceeds a predetermined frequency (viz., a predetermined engine speed). The frequency to which the monostable multivibrator 114 is responsive is controlled by the switches 116 and 118. For example, when switch 116 is closed (conductive) and switch 118 is open (non-conductive) the monostable multivibrator 114 is arranged to change from a high level signal to a low level one, upon the engine speed exceeding 1,200 RPM (merely by way of example), while when switch 116 is open and switch 118 is closed (conductive) the monostable multivibrator 114 is triggered to change from a high level signal to a low level one upon the engine speed reaching a level of 2,150 RPM. The first and second hysteresis circuits 120, 122 receive the output of the monostable multivibrator 114 via line 124 and are arranged, when the monostable multivibrator 114 output changes to a low level, to reduce the frequency at which it will again produce a high level output. Viz, the monostable multivibrator 114 is triggered to change from a high to a low output at 1,200 RPM and maintain the low level until the engine speed has fallen to 1,000–1,150 RPM (by way of example) due to the function of the first hysteresis circuit 120. This of course eliminates on/off hunting of the solenoid. In a similar manner the second hysteresis circuit 122 is arranged to prevent the low level signal from changing to a high level until the engine speed has fallen to 2,000–2,150 RPM.

A shift speed selection circuit 128 is arranged to issue a signal to the gear shift command circuit 112 to change the engine speed at which the transmission is shifted, in response to the load applied to the alternator from the air conditioner 106. This circuit includes a comparator 130, a switch 132 (transistor, for example) and an inverter 134, circuited as shown.

The comparator 130 is arranged to receive a reference voltage (variable for adjustment convenience) on its non-inverting input and a voltage signal which varies with the number of air conditioner fan control switches (137, 138, 139) which are closed, on its inverting terminal. In this arrangement the reference voltage is set so that when switch 137 only is closed, the comparator 130 outputs a low level signal while subsequent to the closure or either of both of switches 138, 139, it generates a high level one. The inverter 134 is arranged to maintain switch 132 closed until a signal from a shift inhibit circuit 140 is issued. The function and operation of this latter mentioned circuit will be set forth hereinlater.

With the circuitry thus far described, when the air conditioner 106 is either not used or the fan thereof operated at a first low level (viz., with only switch 137 closed), the comparator 130 outputs a low level signal whereby, due to the provision of the inverter 124, switch 116 is closed while switch 118 remains open. Accordingly, the monostable multivibrator 114 is conditioned to output a high level signal until the engine speed exceeds the first predetermined level (1,200 RPM). Accordingly, upon the engine reaching the just mentioned rotational speed, the monostable multivibrator 114 ceases to output a high level signal to the base of the power transistor 110, de-energizing the solenoid 108 and thus downshifting the transmission. However, upon one or both of switches 138, 139 being closed, the output of the comparator 130 goes to a high level. Accordingly, switch 116 is opened and switch 118 closed. This of course conditions the monostable multivibrator 114 to output a high level until the engine reaches the second predetermined speed of 2,150 RPM.

However, with this circuit arrangement there is a possibility that while the engine is operating between the selected speeds (1,200–2,150 RPM), one or more of the fan control switches 137, 138 and 139 may be opened or closed and vary the load applied to the alternator.

For example, should the load on the alternator be at a low level when the engine speed reaches the first predetermined engine speed, then the transmission will be downshifted so as to reduce the rotational speed of the alternator. However, while the engine speed is between the first and second predetermined speeds (viz., 1,200 and 2,150 RPM) and all (for example) of the switches 137, 138 and 139 are closed, the control circuit will tend to react to this change in load and cause the transmission to upshift to increase the rotational speed of the alternator to a level suitable for the new load demand. However, as shown in FIG. 13, should this happen, then due to the increased pump speed, the flow-down valve will immediately switch from the phantom line schedule to that shown in solid line and the pump discharge will drop sharply from "A" to "B" as shown. Conversely, should all of the switches 137, 138 and 139 be opened at the same engine speed, then the pump speed will suddenly be decreased and the pump output will suddenly increase from "B" to "A".

Accordingly, the present invention provides for this possibility by including the previously mentioned shift inhibit circuit 140.

In the illustrated arrangement this circuit takes the form of first and second monostable multivibrators 142, 144 and an exclusive OR gate 146. The monostable multivibrators 142, 146 receive the engine speed pulse train signal $S_{RPM}$. The monostable multivibrator 142 is arranged to output a high level signal until the engine speed exceeds the first predetermined engine speed (1,200 RPM) while the second (144) is arranged to output a high level signal until the engine speed exceeds a value just under the second predetermined speed 2,150 RPM (e.g. 2,000 RPM). The exclusive OR gate 146 outputs a high level signal when only one of the two monostable multivibrators 142, 146 outputs a high level signal. Accordingly, while the engine speed is between 1,200 RPM and 2,000 RPM the exclusive OR 146 outputs a high level signal. This signal causes inverter 134 to output a low level signal which renders switch 132 non-conductive and the switch 126 conductive. With switch 126 conductive the output of the monostable multivibrator 114 is connected with inverter 124 and switch 118. Accordingly, the output of the monostable multivibrator 114 is applied to the inverter 124 and switch 118 in place of the signal from the shift speed selection circuit 128 and no shifting of the transmission is induced in the engine speed range of 1,200 to 2,000 RPM due to opening (or closing) of switches 137-139.

What is claimed is:

1. A system comprising:
an engine;
an ancillary device;
a pump for supplying fluid under pressure to a servo mechansim;
a transmission which provides a drive connection between said engine, said ancillary device and said pump, said transmission being shiftable between first and second gear ratios to reduce the rate at which said pump and said ancillary device are driven by said engine;
a valve interposed between said pump and said servo mechanism for modifying the amount of fluid supplied from said pump to said servo, said valve inducing a first flow reduction between first and second pump speeds and second flow reduction between third and forth pump speeds; and
a transmission shift control arrangement which is responsive to the load on said ancillary device in a manner that when said load is below predetermined level said transmission is downshifted from said first gear ratio to the second one at a first engine speed and when said load is above said predetermined level said transmission is downshifted from said first gear ratio to the second one at a second engine speed which is higher than the first one,
said first engine speed being selected to be lower than the engine speeds which correspond to said first pump speed when said transmission is in said first gear ratio, and
said second engine speed being selected to be between the engine speeds which correspond to said second and third pump speeds when said transmission in in said first gear ratio.

2. A system as claimed in claim 1, wherein said transmission shift control arrangement includes means for inhibiting shifting between said first and second ratios when the engine speed is between said first and second engine speeds.

3. A system as claimed in claim 1, wherein:
said ancillary device is an alternator associated with said engine, and
said servo mechanism forms part of a power steering device.

4. A system as claimed in claim 1, wherein said valve comprises:
a body including:
bore;
an inlet port through which pressurized fluid is introduced from said pump;
a drain port; and
a discharge port arrnged to communicate with said servo mechanism;
a valve element in the form of a spool reciprocally disposed in said bore, said spool having first and second lands which define a fixed volume chamber therebetween;
a pressure chamber which communicates with said inlet port and to which one end of said spool is exposed;
a feedback chamber defined in said bore and to which the other end of said spool is exposed;
a first flow restriction between said pressure chamber and said discharge port;
second and third flow restrictions which are arranged in parallel, said second and third flow restrictions being controlled by said first land and arranged to be selectively communicable with said fixed volume chamber in accordance with the position of said first land in said bore;
a first by-pass passage which leads from said pressure chamber to said second and third flow restrictions; and
a second by-pass passage which communicates with said feedback chamber, said fixed volume chamber and said discharge port.

5. A system as claimed in claim 4, wherein said pump is disposed in said body.

6. A system as claimed in claim 1, wherein said transmission shift control arrangement includes:
a first circuit responsive to the rotational speed of said engine for inducing said transmission to shift from said first gear ratio to said second one, upon the rotational speed of said engine reaching one of said first and second engine speeds;
a second circuit responsive to the load on said ancillary device for producing a first signal when the load is below a predetermined level and for producing a second signal when the load is above said predetermined level;
said first circuit being conditioned by said first signal to cause said transmission to downshift at said first engine speed and conditioned by said second signal to cause said transmission to downshift at said second engine speed; and
a third circuit responsive to the speed of said engine being between said first and second engine speeds for inhibiting said first circuit from inducing a downshift while the engine speed is between said first engine speed and an engine speed slightly lower than said second engine speed.

* * * * *